(12) United States Patent
Saito et al.

(10) Patent No.: US 6,554,739 B2
(45) Date of Patent: Apr. 29, 2003

(54) CONTROL SYSTEM FOR AUTOMATIC VEHICLE TRANSMISSIONS

(75) Inventors: Yoshiharu Saito, Wako (JP); Yasushi Inagawa, Wako (JP); Masamitsu Fukuchi, Wako (JP); Shirou Godai, Wako (JP); Takanori Kon, Wako (JP); Shinya Majikina, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 47 days.

(21) Appl. No.: 09/731,795

(22) Filed: Dec. 8, 2000

(65) Prior Publication Data

US 2001/0003722 A1 Jun. 14, 2001

(30) Foreign Application Priority Data

Dec. 9, 1999 (JP) ............................. 11-350893

(51) Int. Cl.[7] .............................................. B60K 41/04
(52) U.S. Cl. ....................................... 477/115; 477/109
(58) Field of Search ................................. 477/115, 116, 477/117, 902, 137, 109, 110

(56) References Cited

U.S. PATENT DOCUMENTS

| | | | | |
|---|---|---|---|---|
| 5,389,052 A | * | 2/1995 | Kruse et al. ............ 477/902 X |
| 5,403,245 A | * | 4/1995 | Watanabe et al. ....... 477/107 X |
| 5,475,591 A | * | 12/1995 | Suzuki et al. ........... 477/115 X |
| 5,580,331 A | * | 12/1996 | Shiraishi et al. ........ 477/902 X |
| 5,785,627 A | * | 7/1998 | Uno et al. ................... 477/109 |
| 5,846,161 A | * | 12/1998 | Hosseini et al. ............ 477/115 |
| 5,944,630 A | * | 8/1999 | Omote ............................ 477/5 |
| 6,014,604 A | * | 1/2000 | Kuroiwa et al. ........ 477/115 X |
| 6,067,494 A | * | 5/2000 | Noda et al. ............. 477/115 X |
| 6,077,191 A | * | 6/2000 | Minowa et al. ............. 477/109 |
| 6,141,615 A | * | 10/2000 | Saito et al. ............. 477/108 X |
| 6,183,393 B1 | * | 2/2001 | Habeck ...................... 477/117 |
| 6,231,479 B1 | * | 5/2001 | Kraska et al. .............. 477/143 |
| 6,438,479 B1 | * | 8/2002 | Ochi et al. .................... 477/73 |

* cited by examiner

*Primary Examiner*—Sherry Estremsky
*Assistant Examiner*—Roger Pang
(74) *Attorney, Agent, or Firm*—Arent Fox Kintner Plotkin & Kahn, PLLC

(57) ABSTRACT

A system for controlling an automatic transmission of a vehicle, wherein the initial value of the desired pressure to be supplied to a hydraulic clutch for the current gear now being engaged is determined appropriately, when conducting a power-on downshifting, so as to decrease the shift shock experienced by the vehicle occupant effectively, irrespectively of the change in the throttle opening, while ensuring to reduce the volume of the mapped data.

20 Claims, 11 Drawing Sheets

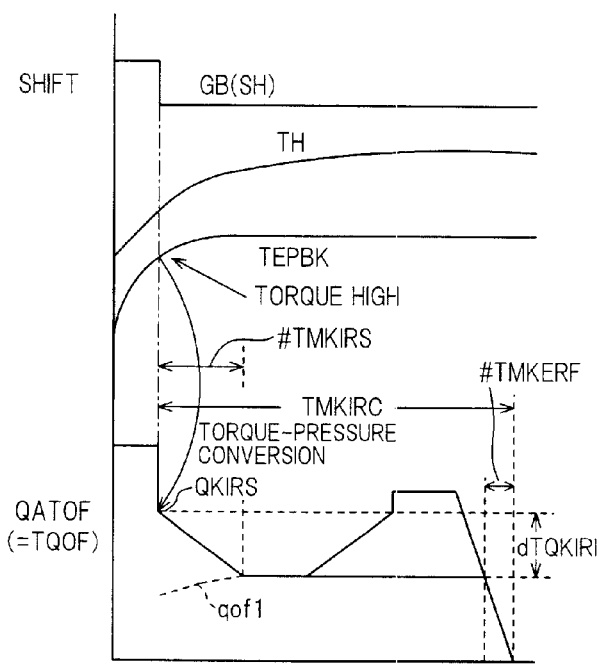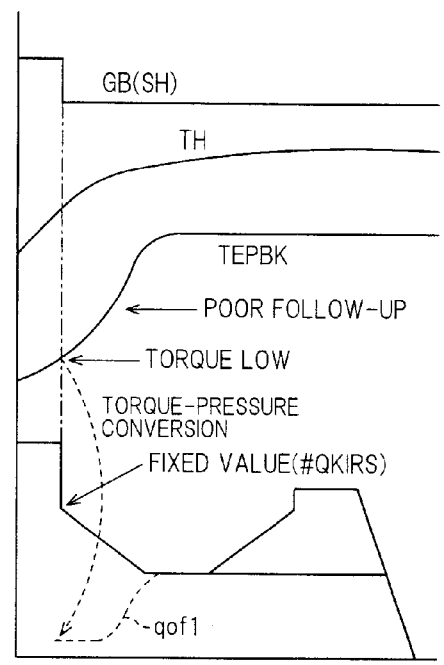
FIG. 7A
FIG. 7B

BASIC EQUATION OF GENERATED CLUTCH TORQUE Tcl
TQOF=2·n·μ·Rm·(QATOF·Apis+Fctf-Frtn)

SOLVING ON CLUTCH PRESSURE Pcll $$qof1 = \left(\frac{TQOF}{2 \cdot n \cdot \mu \cdot Rm} - Fctf + Frtn\right)/Apis$$

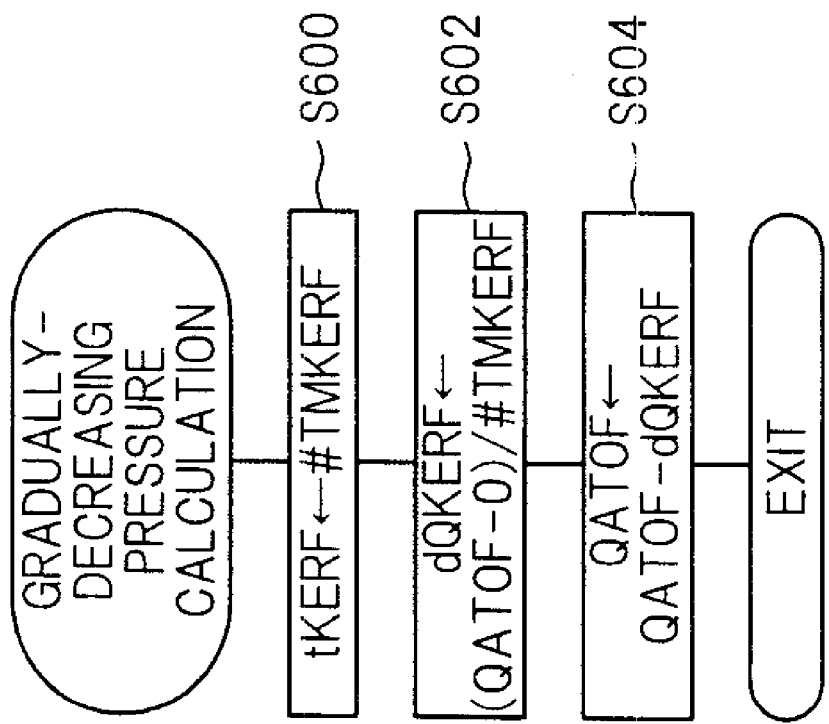

CONTROL SYSTEM FOR AUTOMATIC VEHICLE TRANSMISSIONS

BACKGROUND OF THE INVENTION

1. Field of the Invention

This invention relates to a control system for an automatic vehicle transmission.

2. Description of the Related Art

In the control of automatic transmissions, when power-on downshift (so-called "kick-down"; downshift with the accelerator pedal being depressed) occurs, the initial value of desired pressure to be supplied to the frictional engaging element such as a hydraulic clutch is usually determined by retrieving predetermined mapped data using a torque converter slip ratio, etc. as address data.

However, since it is quite difficult to identify the operating condition just before the power-on downshift occurs, the mapped data must have been prepared through experimentation taking every possible operating conditions into account. This requires much time and needs a great number of engineers to be involved. As a result, the volume of the mapped data becomes large, which necessitates a greater capacity of memory to be stored.

Moreover, since the initial value of the desired pressure is determined based on map-retrievable value obtained by the torque converter slip ratio, etc. in the prior art, it is difficult to follow the change in throttle opening satisfactorily and as a result, the shift shock may sometimes be increased.

BRIEF SUMMARY OF THE INVENTION

An object of this invention is therefore to overcome the aforesaid problems and to provide a control system for automatic vehicle transmission, which determines the initial value of the desired pressure to be supplied to a frictional engaging element such as a hydraulic clutch appropriately so as to decrease the shift shock experienced by the vehicle occupant effectively, irrespectively of the change in he throttle opening, while ensuring to reduce the volume of the mapped data.

In order to achieve the objects, there is provided a system for controlling an automatic transmission of a vehicle having an input shaft connected to an internal combustion engine mounted on the vehicle and an output shaft connected to driven wheels of the vehicle, the transmission transmitting input torque, through any of frictional engaging elements, generated by the engine and inputted by the input shaft to the driven wheels by the output shaft, in accordance with predetermined shift scheduling defining a target gear based on detected operating conditions of the vehicle and the engine, comprising; operating condition detecting means for detecting the operating conditions of the vehicle and the engine including at least an engine speed; input shaft rotational speed detecting means for detecting an input shaft rotational speed inputted to the transmission; first torque calculating means for calculating an a first torque to be inputted to the transmission based on at least the detected operating conditions and the input shaft rotational speed; second torque calculating means for calculating a second torque necessary for advancing a torque necessary for advancing shifting in the transmission based on at least the detected operating conditions and the input shaft rotational speed, when the shifting is downshifting; desired value calculating means for calculating a desired value to be supplied to one of the frictional engaging element now being engaged based on a difference obtained by subtracting the second torque from the first torque; and hydraulic pressure control circuit for supplying hydraulic pressure to the one of the frictional engaging elements based on at least the calculated desired value.

BRIEF DESCRIPTION OF THE DRAWINGS

This and other objects and advantages of the invention will be more apparent from the following description and drawings, in which:

FIG. 7 is a time chart showing the control of power-on downshift referred to the flow chart of FIG. 3;

FIG. 12 is a flow chart showing the subroutine of an OFF-side gradually-decreasing pressure (clutch pressure QATOF) referred to in the flow chart of FIG. 3.

DETAILED DESCRIPTION OF THE PREFERRED EMBODIMENTS

An embodiment of the invention will now be explained with reference to the attached drawings.

Figure 1:
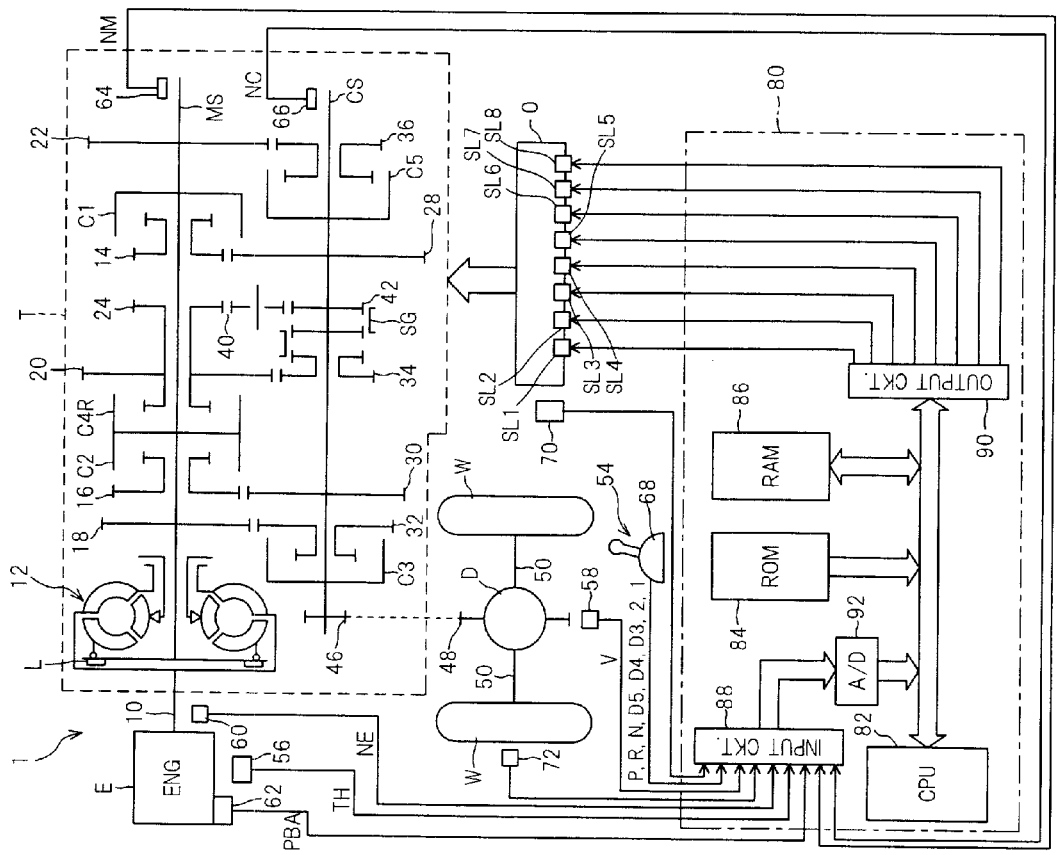
FIG. 1 is an overall schematic view of a control system for an automatic vehicle transmission according to the invention.

FIG. 1 is an overall schematic view of a control system for an automatic vehicle transmission according to the invention.

As shown in FIG. 1, a vehicle 1, illustrated partially by a driven wheel W (referred to later), etc., has an internal combustion engine E (referred to simply as "engine") mounted thereon and an automatic vehicle transmission T (referred to simply as "transmission"). The transmission T comprises the type of parallel-installed-shafts of five forward ratios.

Specifically, the transmission T is equipped with a main shaft (transmission input shaft) MS connected to a crankshaft 10 of the engine E through a torque converter 12 having a lockup mechanism L, and a countershaft CS provided in parallel with the main shaft MS. These shafts carry gears.

More specifically, the main shaft MS carries a main first gear 14, a main second gear 16, a main third gear 18, a main fourth gear 20, a main fifth gear 22 and a main reverse gear 24. The countershaft CS carries a counter first gear 28 which meshes with the main first gear 14, a counter second gear 30 which meshes with the main second gear 16, a counter third gear 32 which meshes with the main third gear 18, a counter fourth gear 34 which meshes with the main fourth gear 20, a counter fifth gear 36 which meshes with the main fifth gear 22 and a counter reverse gear 42 which meshes with the main reverse gear 24 through a reverse idle gear 40.

In the above, 1st gear (first speed or gear ratio) is established or effected when the main first gear 14 rotatably mounted on the main shaft MS is engaged with the main shaft MS by a first-gear hydraulic clutch C1. 2nd gear (second speed or gear ratio) is established when the main second gear 16 rotatably mounted on the main shaft MS is engaged with the main shaft MS by a second-gear hydraulic clutch C2. 3rd gear (third speed or gear ratio) is established when the counter third gear 32 rotatably mounted on the countershaft CS is engaged with the countershaft CS by a third-gear hydraulic clutch C3.

4th gear (fourth speed or gear ratio) is established when the counter fourth gear 34 rotatably mounted on the countershaft CS is engaged with the countershaft CS by a selector gear SG and with this state maintained, the main fourth gear 20 rotatably mounted on the main shaft MS is engaged with the main shaft MS by a fourth-gear/reverse hydraulic clutch C4R. 5th gear (fifth speed or gear ratio) is established when the counter fifth gear 36 rotatably mounted on the countershaft CS is engaged with the countershaft CS by a fifth-gear hydraulic clutch C5.

The reverse gear is established when the counter reverse gear 42 rotatably mounted on the countershaft CS is engaged with the countershaft CS by the selector gear SG and with this state maintained, the main reverse gear 24 rotatably mounted on the main shaft MS is engaged with the main shaft MS by the fourth-gear/reverse hydraulic clutch C4R.

The rotation of the countershaft CS is transmitted through a final drive gear 46 and a final driven gear 48 to a differential D, from where it is transmitted to the driven wheels W, through left and right drive shafts 50, 50 of the vehicle 1 on which the engine E and the transmission T are mounted.

A shift lever 54 is installed on the vehicle floor near the operator's seat to be manipulated by the vehicle operator to select one from among eight positions P, R, N, D5, D4, D3, 2 and 1.

A throttle position sensor (engine load detecting means) 56 is provided in the air intake pipe (not shown) of the engine E at a point in the vicinity of a throttle valve (not shown) and generates a signal indicative of the degree of throttle valve opening TH. A vehicle speed sensor 58 is provided in the vicinity of the final driven gear 48 and generates a signal indicative of the vehicle traveling speed V once every rotation of the final driven gear 48.

A crankshaft sensor 60 is provided in the vicinity of the crankshaft of the engine E and generates a CYL signal once every a predetermined crank angular position of a predetermined cylinder, a TDC signal at a predetermined crank angular position of each cylinder and a CRK signal at a predetermined crank angular position (such as 15 crank angles) obtained by dividing the interval between the TDC signals. A manifold absolute pressure sensor 62 is installed in the air intake pipe of the engine E at a point in the vicinity of the throttle valve and generates a signal indicative of the manifold absolute pressure PBA indicative of the engine load.

A first rotational speed sensor 64 is provided in the vicinity of the main shaft MS and generates a signal indicative of the rotational speed NM of the transmission input shaft from the rotation of the main shaft MS. A second rotational speed sensor 66 is provided in the vicinity of the countershaft CS and generates a signal indicative of the rotational speed NC of the transmission output shaft from the rotation of the countershaft CS.

A shift lever position switch 68 is provided in the vicinity of the shift lever 54 and generates a signal indicating which of the aforesaid eight positions is selected by the vehicle operator. An oil temperature sensor 70 is installed in the transmission T or at an appropriate location close thereto and generates a signal indicative of the oil temperature, i.e., the temperature TATF of Automatic Transmission Fluid. And a brake switch 72 is provided in the vicinity of a brake pedal (not shown) and generates an ON signal when the brake pedal is depressed by the vehicle operator.

The outputs of the sensors 56, etc., are sent to an ECU (electronic control unit) 80. The ECU is constituted as a microcomputer comprising a CPU (central processing unit) 82, a ROM (read-only memory) 84, a RAM (random access memory) 86 and an input circuit 88, an output circuit 90 and an A/D converter 92. The outputs of the sensors 56, etc., are inputted to the microcomputer from the input circuit 88.

The analog outputs of the sensors are converted into digital values through the A/D converter 92 and are stored in the RAM 86, while the digital outputs of the sensors are processed by a processing circuit such as a wave-form shaper (not shown) and are stored in the RAM 86.

The outputs of the vehicle speed sensor 58 and the CRK signal outputted by the crank angle sensor 60 are inputted to a counter (not shown) to be counted to determine the vehicle speed V and the engine speed NE. Similarly, the outputs of the first and second rotational speed sensors 64, 66 are counted by the counter to determine th input shaft rotation sped NM and the output rotation speed NC of the transmission T.

The CPU 82 of the microcomputer determines the (target) gear (gear ratio) to be shifted to and energizes/deenergeizes shift solenoids SL1 to SL5 (each comprises an electromagnetic solenoid) of a hydraulic pressure control circuit O, through the output circuit 90 and a voltage pressure circuit (not shown), to control the supply of the hydraulic pressure to the clutches such that the shift is effected, and energizes/deenergizes linear solenoids SL6 to SL8 (each comprises an electromagnetic solenoid) to control the operation of the lockup clutch L of the torque converter 12.

The operation of the control system of an automatic vehicle transmission according to the invention will be explained.

Figure 2:
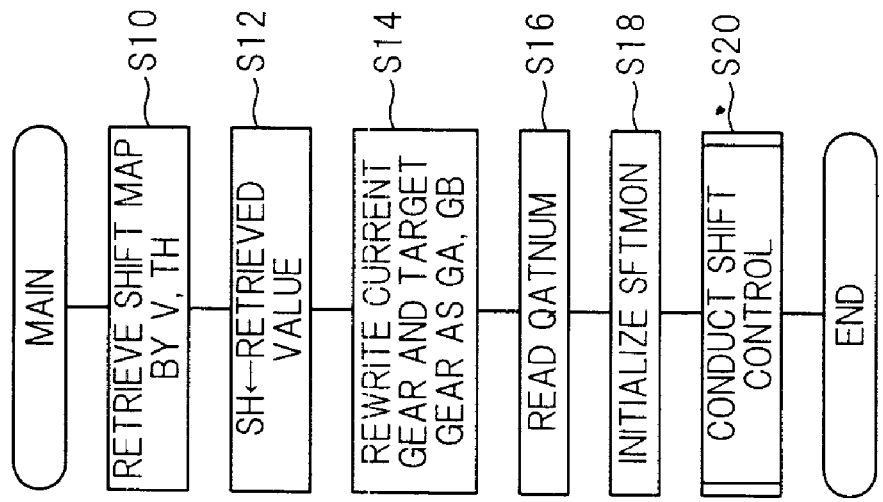
FIG. 2 is a main flow chart showing the operation of the system illustrated in FIG. 1.

FIG. 2 is a flow chart showing the operation of the system. The program illustrated here is executed once every 10 msec.

Explaining this, the program begins in S10 in which a known shift map (shift scheduling map; not shown) is retrieved using the detected vehicle speed V and the throttle opening TH, and proceeds to S12 in which the retrieved value is determined to be a target gear (to be engaged with or shifted to) SH. The program then proceeds to S14 in which the current gear (now being engaged) is rewritten as or named GA and the target gear SH is rewritten as or renamed GB.

The program then proceeds to S16 in which QATNUM (indicative of shift mode) is read. The shift mode QATNUM is prepared in a memory of the RAM 86 (or ROM 84) and indicates the mode of shift. Specifically, it is expressed, for example, as 11h (indicating upshift from 1st to 2nd gear), 21h (indicating downshift from 2nd to 1st), 31h (indicating that 1st gear should be held). More specification, the first numeral of the shift mode QATNUM indicates the mode of shift as 1: upshifting, 2: downshifting and 3: holding current gear. In the below, it will be mentioned that whether the shift mode QATNUM is 1*h, for example. This means that it should be determined that the shift is, whichever the gear is, upshifting.

The program then proceeds to S18 in which SFTMON is initialized to 0, when it is determined that shift control is needed from the processing in S10 and on. The SFTMON is prepared in a memory of the RAM 86 (or ROM 84) and indicates the timing points of the shift control. The program then proceeds to S20 in which the shift control is conducted. If the first numeral of the shift mode QATNUM is 3, the current gear is held and no shift control is implemented.

Figure 3:
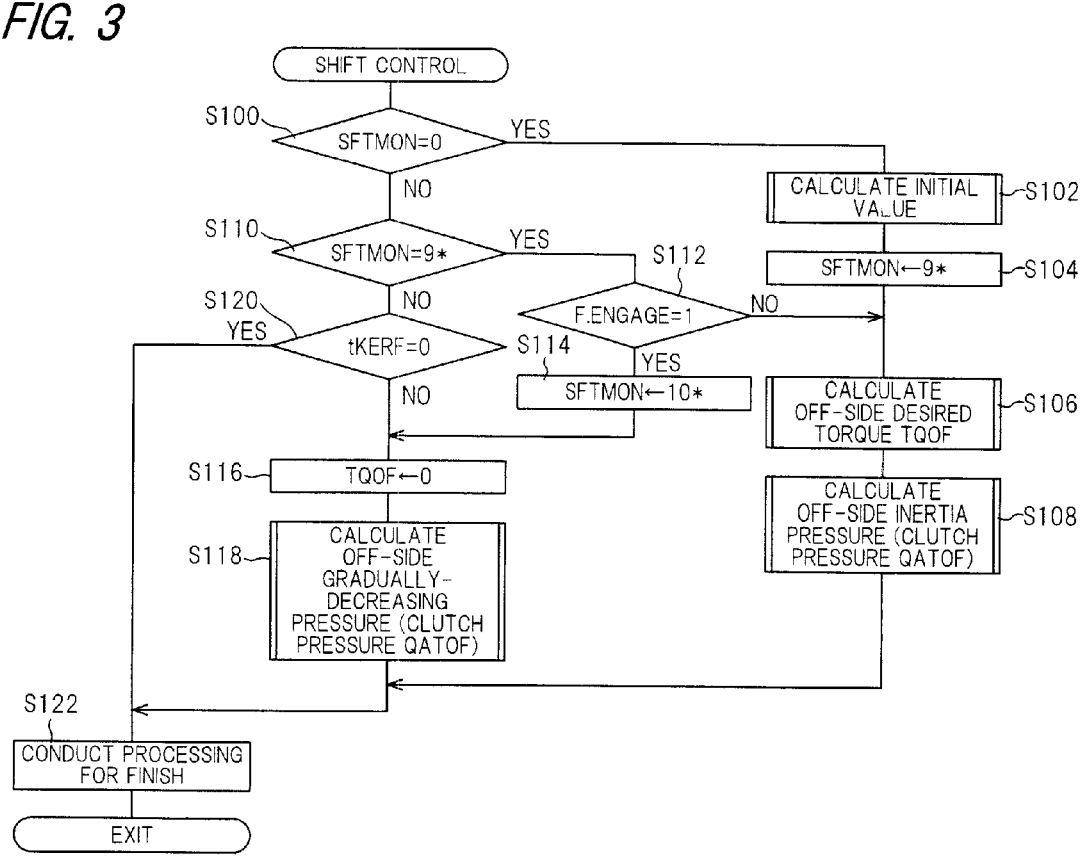
FIG. 3 is a flow chart showing the subroutine of conducting shift control, taking the power-on downshift as an example, referred to in the flow chart of FIG. 2.
Figure 4:
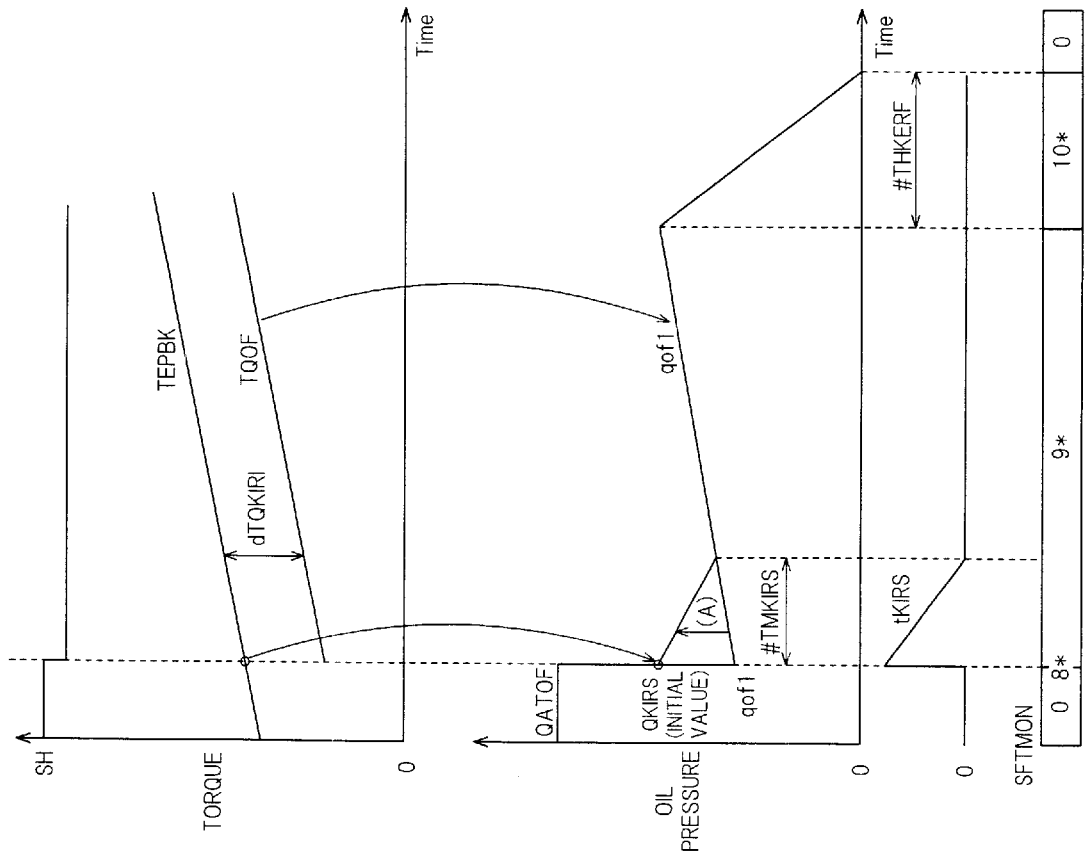
FIG. 4 is a time chart showing the control points referred to in the flow chart of FIG. 3.

FIG. 3 is a flow chart showing the subroutine of the shift control referred to in S20 of FIG. 2 and FIG. 4 is a time chart showing the progress of the shift control with the SFTMON.

In the below, the shift control will be explained taking the downshift, specifically the power-on downshift as an example. More specifically, the shift control will be explained taking as an example the situation where the power-on downshift occurs and, in particular, the determination of pressure supply to an OFF-side clutch. Here, the term "OFF-side" indicates the clutch to be relieved or disengaged (i.e. that for the current gear), while the term "ON-side" indicates the clutch to be engaged (i.e., that for the target gear to be shifted to).

Explaining the control illustrated in the flow chart referring to the time chart shown in FIG. 4, the program begins in S100 in which it is determined whether the value of SFTMON is 0. Since the value of SFTMON was initialized to 0 in S18, the result is affirmative and the program proceeds to S102 in which the initial value of an OFF-side clutch pressure (desired value), when the power-on downshift occurs, is calculated.

Figure 5:
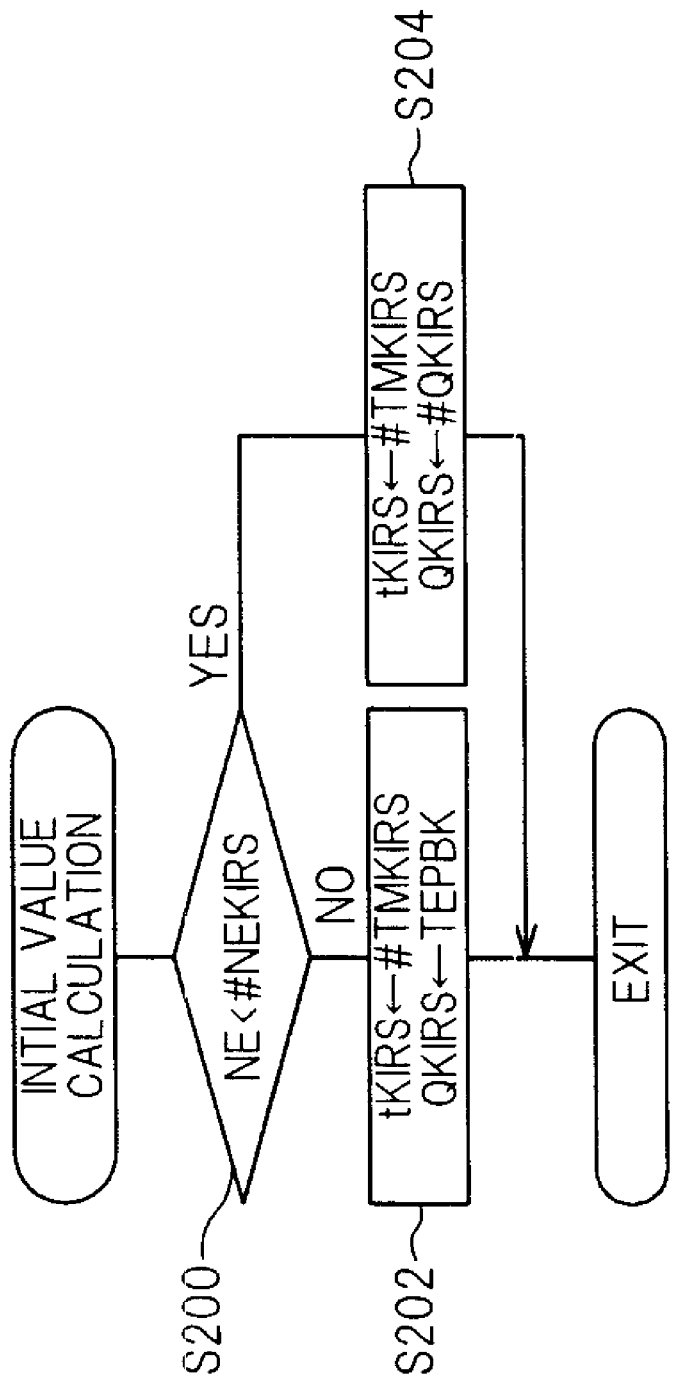
FIG. 5 is a flow chart showing the subroutine of calculating an initial value referred to in the flow chart of FIG. 3.

FIG. 5 is a flow chart showing the subroutine for the calculation.

The program begins in S200 in which it is determined whether the detected engine speed NE is less than a predetermined speed #NEKIRS (e.g. 1500 rpm) and when the result is negative, the program proceeds to S202 in which a timer (down-counter) tKIRS is set with a predetermined value #TMKIRS to start time measurement, and an engine torque TEPBK (input torque to be inputted to the transmission T) is determined to be an initial value (converted in pressure) QKIRS of the OFF-side clutch pressure (which will be referred to as "QATOF") to be supplied to the OFF-side clutch of the current gear (GA).

On the other hand, when the result in S200 is affirmative, the program proceeds to S204 in which the timer (down-counter) tKIRS is similarly set with the predetermined value #TMKIRS to start time measurement, and a predetermined value (fixed value) #QKIRS is determined to be the initial value QKIRS.

Figure 6:
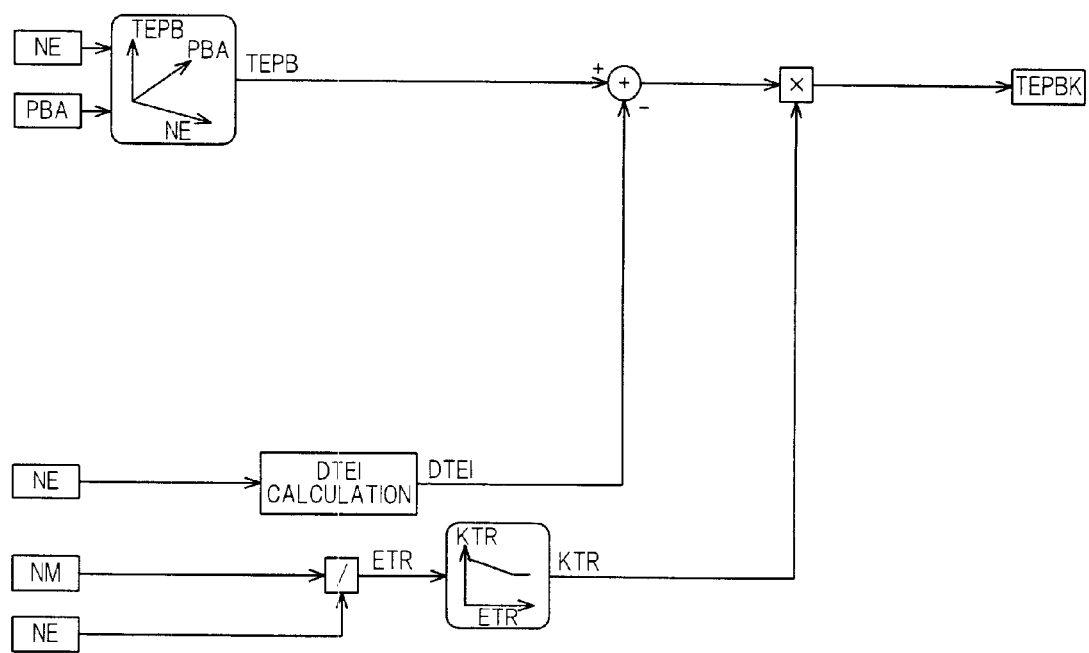
FIG. 6 is a block diagram showing the estimation or calculation of an engine torque referred to in the flow chart of FIG. 5.

As illustrated in FIG. 6, in the system in the embodiment, the engine torque (input torque) TEPBK is estimated or determined based on a map-retrieved value TEPB obtained by retrieving mapped data using the engine speed NE and the manifold absolute pressure PBA as address data. In parallel thereto, a value indicative of inertia toque DTEI used for raising the engine speed NE therefore is calculated and is subtracted from the value TEPB, and the difference is multiplied by a torque converter slip rate KTR to determine the estimate engine torque TEPBK. The torque converter slip rate KTR is determined by calculating a ratio between the detected engine speed NE and the input shaft rotational speed NM to determine a toque converter slip ratio ETR and by retrieving table data by the calculated torque converter slip ratio ETR, as illustrated.

Here, the operation of the system according to the embodiment with reference to the time chart of FIG. 4 and a time chart shown in FIG. 7 is briefed.

As mentioned above, since it is quite difficult to identify the operating condition just before the power-on downshift occurs, the mapped data must have been prepared through experimentation taking every possible operating conditions into account. This requires much time and needs a great number of engineers to be involved. As a result, the volume of the mapped data becomes large, which necessitates a greater capacity of memory to be stored.

Moreover, since the initial value of the desired pressure is determined based on map-retrievable value obtained by the torque converter slip ratio, etc. in the prior art, it is difficult to follow the change in throttle opening satisfactorily and as a result, the shift shock may sometimes be increased.

In view of the above, the system is configured to determine the initial value of the OFF-side clutch pressure to be supplied to the OFF-side clutch based on the engine toque (input torque) so as to decrease the shift shock experienced by the vehicle occupant effectively, irrespectively of the change in the throttle opening, while ensuring to reduce the volume of the mapped data.

Specifically, as illustrated in FIG. 4, when the power-on downshift occurs, the engine torque (input torque) TEPBK is used to determine the initial value QKIRS of the ON-side clutch pressure (desired value) QATOF to be supplied the OFF-side clutch.

The predetermined value #TMKIRS set on the timer tKIRS indicates a period of time of countdown and is set to be variable by the shift mode QATNUM, the vehicle speed V, and the throttle opening TH. As will be explained later, the OFF-side clutch pressure QATOF is controlled to decrease gradually.

Explaining the processing in S202 and S204 of the flow chart of FIG. 5, when the engine speed NE is low, the manifold absolute pressure PBA can only follow the change of the throttle opening TH with lag and the estimation accuracy of the engine torque TEPBK is not satisfactory. In that situation, if the estimated engine torque TEPBK is used as the initial value, as illustrated in FIG. 7B, the clutch pressure starting from the initial value QKIRS (illustrated as "qof1" in the figure) could be excessively small. For this reason, in the system of the embodiment, as shown in FIG. 7A, the fixed value #QKIRS is used.

Further, the system is configured to calculate an inertia torque dTQKIRI necessary for advancing the shift in the transmission T, to subtract the inertia torque dTQKIRI from the estimated engine torque TEPBK, and to determine the OFF-side clutch pressure QATOF based on the difference. The inertia torque dTQKIRI is calculated by dividing the inertia EI (explained later) by a desired shift time TMKIRC.

Furthermore, if the pressure determined from the difference (TEPBK-dTQKIRI) were immediately supplied to the OFF-side clutch, the torque could change sharply, resulting in an increased shift shock. Therefore, the system is configured to decrease the OFF-side clutch pressure QATOF gradually from the initial value within a predetermined period of time.

To be more specific, the system is configured, as illustrated in FIG. 4 and 7, each time the program is looped, to calculate the difference between the initial value QKIRS and qof1 (value used for determining QATOF) and a ratio between the timer value tKIRS and the predetermined value #TMKIRS (set on the timer), to calculate a product obtained by multiplying the difference by the ratio (tKIRS/#TMKIRS) and add it to qof1 to determine the OFF-side clutch pressure (desired value) QATOF.

Returning to the explanation of the flow chart of FIG. 3, the program proceeds to S104 in which the value of SFT-MON is set to 9* (illustrated in FIG. 4), to S106 in which the OFF-side desired clutch torque TQOF is calculated.

Figure 8:
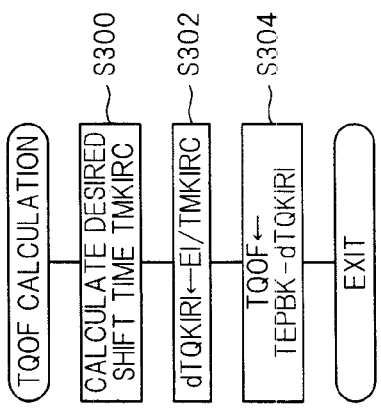
FIG. 8 is a flow chart showing the subroutine of an OFF-side desired clutch torque TQOF referred to in the flow chart of FIG. 3.

FIG. 8 is a flow chart showing the subroutine of the calculation.

Program begins in S300 in which the aforesaid desired shift time TMKIRC is calculated. The desired shift time TMKIRC is prepared beforehand as mapped data (whose characteristic is not shown) through experimentation based on a desired acceleration of gravity acting on the vehicle in the longitudinal direction thereof to be retrievable by the change of throttle opening TH (throttle depression speed) and the vehicle speed V. Therefore, in S300, the desired shift time TMKIRC is calculated by retrieving the mapped data.

The program then proceeds to S302 in which the aforesaid inertia EI is first calculated as follows:

$$EI = ie * \Delta NE * ims * \Delta NM$$

where, ie: engine inertia (fixed value determined through experimentation); $\Delta NE$; difference between the detected engine speed NE and a predicted engine speed after shift (calculated from an estimated post-shift torque converter slip ratio); ims: the inertia of the main shaft MS (fixed value determined through experimentation); and $\Delta NM$: the difference between the detected input shaft rotational speed NM and a predicted input shaft rotational speed after shift (calculated from the input shaft rotational speed NM and the gear reduction ratios). The sign "*" indicates multiplication.

Then, the calculated inertia EI is divided by the desired shift time TMKIRC and the obtained quotient is determined as the aforesaid inertia torque dTQKIRI necessary for advancing the shift.

The program then proceeds to S304 in which the inertia torque dTQKIRI is subtracted from the engine torque (input torque) TEPBK and the obtained difference is determined to be the OFF-side desired clutch torque TQOF.

Again returning to the explanation of the flow chart of FIG. 3, the program proceeds to S108 in which the OFF-side inertia pressure (as the OFF-side clutch pressure QATOF) is calculated.

Figure 9:
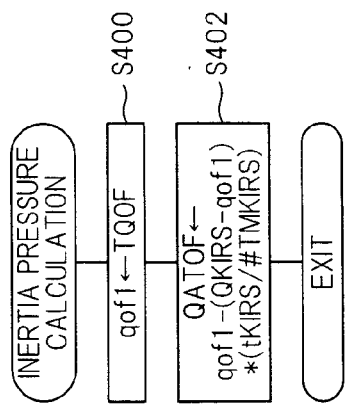
FIG. 9 is a flow chart showing the subroutine of an OFF-side inertia pressure (clutch pressure QATOF) referred to in the flow chart of FIG. 3.

FIG. 9 is a flow chart showing the subroutine of the calculation.

The program begins in S400 in which the calculated OFF-side desired clutch torque TQOF is converted into the desired clutch pressure qof1 using a torque-pressure conversion mentioned below. The program then proceeds to S402 in which the OFF-side inertia pressure (clutch pressure QATOF) to be supplied to the OFF-side clutch is calculated (as the OFF-side clutch pressure QATOF to be supplied to the OFF-side clutch) in the manner shown there.

Here, the torque-pressure conversion will be explained.

When converting a torque value to a hydraulic pressure value, although the converted pressure value usually corrected by the ATF temperature in the prior art. However, it is difficult to make the temperature correction characteristic uniform. Further, the other parameters such as the vehicle speed V (in other words., the rotational difference) and throttle opening TH (in other words, the hydraulic pressure) should also be taken into account.

Figure 10:
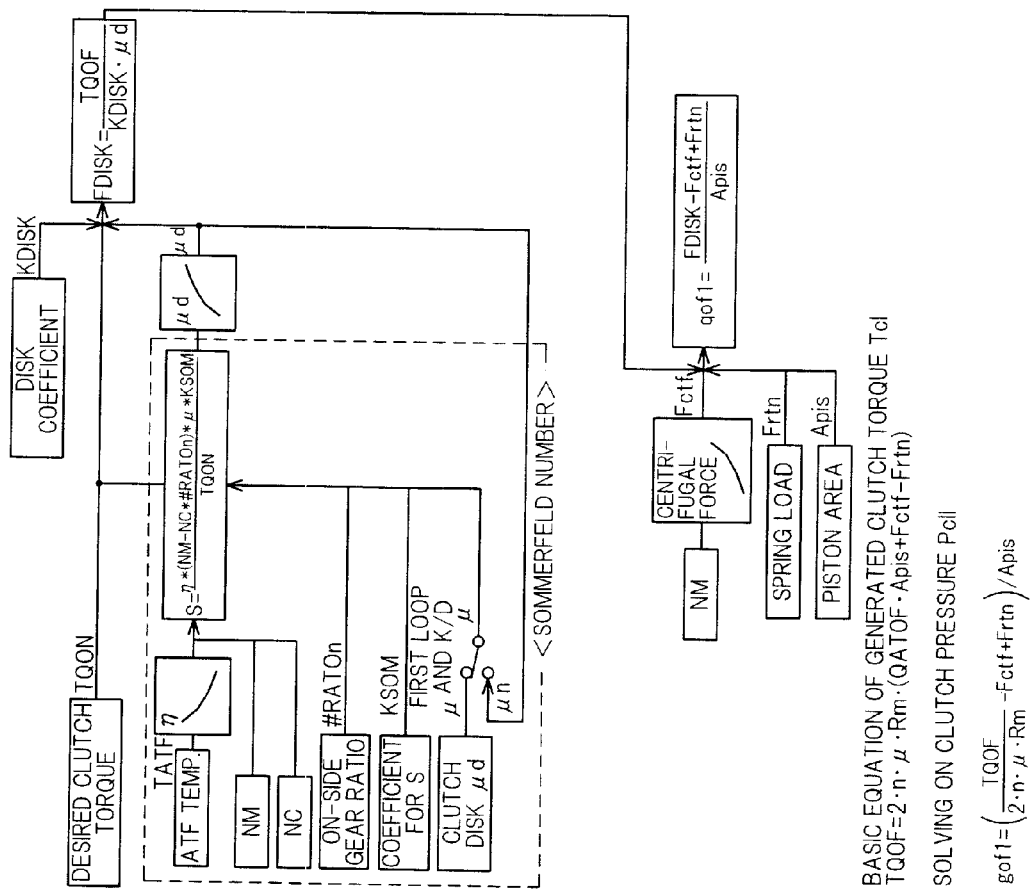
FIG. 10 is a block diagram showing the torque-pressure conversion referred to in the flow chart of FIG. 9.

In view of the above, as illustrated in FIG. 10, the system according to the embodiment is configured to determine the Sommerfeld number (dimensionless number) based on the viscosity of ATF and the surface pressure of the hydraulic clutch (Cn), to estimate the clutch friction coefficient $\mu$ (more precisely, the clutch dynamic friction coefficient $\mu d$) and to conduct the torque-pressure conversion using the estimated clutch friction coefficient.

Figure 11:
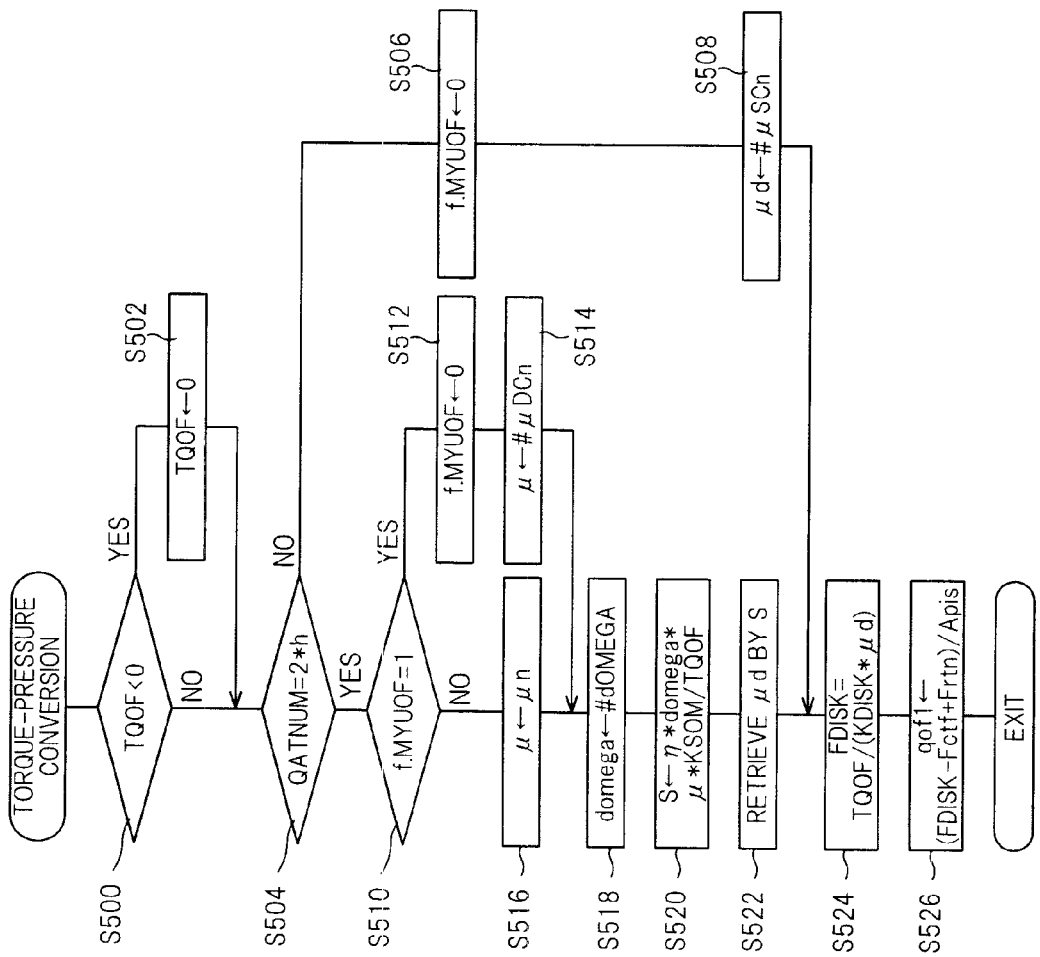
FIG. 11 is a flow chart similarly showing the torque-pressure conversion referred to in the flow chart of FIG. 9.

Explaining this with reference to a flow chart of FIG. 11, the program begins in S500 in which it is determined whether the calculated OFF-side desired clutch toque TQOF is less than 0, in other words, it is determined whether TQOF is a negative value and when the result is affirmative, the program proceeds to S502 in which the OFF-side desired clutch torque TQOF is determined to be 0.

The program then proceeds to S504 in which it is determined whether the value of the shift mode QATNUM is 2*h, in other words, it is determined whether the shift is the downshift and when the result is negative, the program proceeds to S506 in which the bit of a flag f.MYUOF (for determining whether it is the first program loop) is reset to 0, and to S508 in which the friction coefficient $\mu d$ is set to be a predetermined value #$\mu$SCn (corresponding to static friction coefficient), since the main purpose of the OFF-side pressure control in the upshift is prevent the clutch from slipping.

When the result in S504 is affirmative, since this indicates that the shift is the downshift, the program proceeds to S510 in which it is determined whether the bit of the flag f.MYUOF is set to 1 and when the result is affirmative, the program proceeds to S512 in which the bit of the flag is reset to 0, and to S514 in which the friction coefficient p is set to be an initial value # $\mu$DCn. When the result in S510 is negative, the program proceeds to S516 in which the preceding value of $\mu$n (the value at the program loop n time§) earlier) is renamed as $\mu$.

The program then proceeds to S518 in which a clutch rotational difference domega is set to be a constant value #dOMEGA. The program then proceeds to S520 in which the parameter S (Sommerfeld number) is calculated in the manner shown there. Here, $\eta$ indicates the viscosity of ATF and is calculated by retrieving table data by the detected ATF temperature TATF.

The program then proceeds to S522 in which the clutch dynamic friction coefficient $\mu d$ is retrieved from table data using the parameter S as address datum, to S524 in which a value FDISK (indicative of the clutch disk pressing force by hydraulic pressure) is calculated, and to S526 in which a value Fctf (indicative of the hydraulic pressure centrifugal force component acting on the clutch drum) is subtracted from the value FDISK, a value Frtn (indicative of the return spring force) is added to the obtained difference, and then the obtained sum is divided by a value Apis (indicative of the clutch piston's pressure-receiving area) and determines the quotient as the desired clutch pressure qof1. The value Fctf is obtained by retrieving table data by the input shaft rotational speed NM.

Returning to the explanation of the flow chart of FIG. 3, in the next program loop, the result in S100 is negative and the program proceeds to S110 in which it is determined whether the value of SFTMON is 9*. Since the value of SFTMON was rewritten to 9*, the result is normally affirmative and the program proceeds to S112 in which it is determined whether the bit of a flag F. ENGAGE is set to 1.

Since the bit of the flag is set to 1 in a routine (not shown) when the ON-side clutch is engaged, this amounts for determining whether the ON-side clutch has been engaged.

Since the gist of the invention resides in the OFF-side clutch pressure control in the power-on downshift, although the explanation of determination of the pressure control in the ON-side is omitted, it should be noted that the determination of the ON-side clutch pressure is to be carried in an appropriate manner.

Each time the result in S112 is determined to be negative, the program proceeds to S106. As a result, the OFF-side clutch pressure QATOF is gradually decreased until the predetermined time #TMKIRS has lapsed.

On the other hand, when the result in S112 is affirmative, the program proceeds to S114 in which the value of SFT-MON is written as 10*, and to S116 in which the OFF-side desired clutch torque TQOF is determined to be 0, and to S118 in which the OFF-side gradually decreasing pressure is calculated (as the OFF-side clutch pressure QATOF).

FIG. 12 is a flow chart showing the subroutine for the calculation.

The program begins in S600 in which a timer (down-counter) tKERF is set with a predetermined value #TMK-ERF (illustrated in FIGS. 4 and 7) and starts time measurement.

The program then proceeds to S602 in which the OFF-side gradually decreasing pressure dQKERF is calculated in the manner shown there, and to S604 in which the calculated OFF-side gradually-decreasing pressure dQKERF is subtracted from the OFF-side clutch pressure QATOF to correct the same.

Again returning to the explanation of the flow chart of FIG. 3, in the next program loop, the result in S110 is negative, the program proceeds to S120 in which it is determined whether the value of the timer tKERF has reached zero. Each time the result is determined to be negative, the program proceeds to S116 to decrease the OFF-side clutch pressure QATOF gradually. On the other hand, the program proceeds to S122 in which the parameters are reset to zero and other processing necessary for finishing is conducted.

Having been configured in the foregoing manner, the volume of the mapped data can be decreased and the system can determine the initial value of the OFF-side clutch pressure QATOF appropriately so as to effectively decrease the shift shock experienced by the vehicle occupant, irrespectively of the change of the throttle opening TH. Further, by decreasing the OFF-side clutch pressure gradually for a predetermined period of time #TMKIRS, it can reduce the shift shock effectively.

Further, when the engine speed NE is low, the manifold absolute pressure PBA can only follow the change of the throttle opening TH with lag and the estimation accuracy of the engine torque TEPBK is not satisfactory. In that situation, if the estimated engine torque TEPBK is used as the initial value, as illustrated in FIG. 7, the clutch pressure could be excessively small. However, in the system of the embodiment, as shown in FIG. 7, since the fixed value #QKIRS is used, it can solve the problem.

The embodiment is thus configured to have a system for controlling an automatic transmission (T) of a vehicle (1) having an input shaft (MS) connected to an internal combustion engine (E) mounted on the vehicle and an output shaft (CS) connected to driven wheels (W) of the vehicle, the transmission transmitting input torque, through any of frictional engaging elements (Cn), generated by the engine and inputted by the input shaft to the driven wheels by the output shaft, in accordance with predetermined shift scheduling (S10) defining a target gear (SH, GB) based on detected operating conditions of the vehicle and the engine, including; hydraulic pressure control circuit (O) for supplying hydraulic pressure to the frictional engaging elements based on at least the calculated hydraulic pressure (QATON). The characteristic features are that the system includes: operating condition detecting means (60, 62, 56, 80) for detecting the operating conditions of the vehicle and the engine including at least an engine speed (NE); input shaft rotational speed detecting means (64, 80) for detecting an input shaft rotational speed (NM) inputted to the transmission (T); first torque calculating means (80, S20, S102, S200–S204) for calculating an a first torque (TEPBK, QKIRS) to be inputted to the transmission (T) based on at least the detected operating conditions and the input shaft rotational speed (NM); second torque calculating means (80, S20, S106, S300, S302) for calculating a second torque (dTQKIRI) necessary for advancing a torque necessary for advancing shifting in the transmission based on at least the detected operating conditions and the input shaft rotational speed (NM), when the shifting is downshifting; and desired value calculating means (80, S20, S10, S108 S108–S118, S304, S400–402, S500–S528, S600–S604) for calculating a desired value (TQOF (qof1, QATOF)) to be supplied to one of the frictional engaging element now being engaged based on a difference obtained by subtracting the second torque (dTQKIRI) from the first torque (TEPBK); and the hydraulic pressure control circuit (O) supplies hydraulic pressure to the one of the frictional engaging elements based on at least the calculated desired value (QATON). With this, it can determine the initial value of the desired pressure to be supplied to a frictional engaging element such as a hydraulic clutch appropriately so as to decrease the shift shock experienced by the vehicle occupant effectively, irrespectively of the operating conditions, more specifically the change in he throttle opening, while ensuring to reduce the volume of the mapped data.

In the system, the desired value calculating means calculates the desired value (TQOF) corresponding to be the first torque (TEPBK) when the shifting begins and to be decreased with respect to time after the shifting begins (S200–S204, S300–S304). With this, it can determine the initial value of the desired pressure to be supplied to a frictional engaging element such as a hydraulic clutch appropriately so as to decrease the shift shock more effectively.

In the system, the desired value calculating means calculates the desired value (TQOF) to be decreased with respect to time for a predetermined period of time (TMKIRC) after the shifting begins (S200–S204, S300–S304). With this, it can determine the initial value of the desired pressure to be supplied to a frictional engaging element such as a hydraulic clutch appropriately so as to decrease the shift shock more effectively.

In the system, the first torque calculating means includes; engine speed discriminating means (80, S20, S102, S200) for discriminating whether the detected engine speed (NE) is less than a predetermined speed (#NEKIRS); and when the detected engine speed is discriminated to be less than the predetermined value, calculates the first torque to be a predetermined value (#QKIRS, S204). With this, when the engine speed is low, the manifold absolute pressure can only follow the change of the throttle opening with lag and the estimation accuracy of the engine torque is not satisfactory. In that situation, it can determine the initial value of the desired pressure to be supplied to a frictional engaging element such as a hydraulic clutch appropriately so as to decrease the shift shock more effectively.

In the system, the transmission has a torque converter (12) and the first torque calculating means includes engine torque calculating means (80, S20, S102, S200–S204) for calculating an engine torque (TEPB) generated by the engine (E) in accordance with a predetermined characteristics based on at least an engine speed (NE) and an engine load (PBA) of the detected operating conditions; inertial torque calculating means (80, S20, S102, S200–S204) for calculating a parameter (DTEI) indicative of an inertia torque used raising the engine speed (NE) based on the engine speed; and torque converter torque ratio calculating means (80, S20, S102, S200–S204) for calculating a torque ratio (KTR, ETR) of the torque converter (12); and calculates the input torque (TEPBK) based on at least the calculated engine torque (TEPB), the calculated parameter (DTEI) and the calculated torque ratio (KTR). With this, it can determine the initial value of the desired pressure to be supplied to a frictional engaging element such as a hydraulic clutch appropriately more effectively so as to decrease the shift shock more effectively.

It should be noted in the above, although the engine torque is estimated or calculated, it is alternative possible to use a torque sensor to determine the engine torque.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling an automatic transmission of a vehicle having an input shaft connected to an internal combustion engine mounted on the vehicle and an output shaft connected to driven wheels of the vehicle, the transmission transmitting input torque, through any of frictional engaging elements, generated by the engine and inputted by the input shaft to the driven wheels by the output shaft, in accordance with predetermined shift scheduling defining a target gear based on detected operating conditions of the vehicle and the engine, comprising:

operating condition detecting means for detecting the operating conditions of the vehicle and the engine including at least an engine speed;

input shaft rotational speed detecting means for detecting an input shaft rotational speed inputted to the transmission;

first torque calculating means for calculating a first torque to be inputted to the transmission based on at least the detected operating conditions and the input shaft rotational speed;

second torque calculating means for calculating a second torque necessary for advancing shifting in the transmission based on at least the detected operating conditions and the input shaft rotational speed, when the shifting is downshifting;

desired value calculating means for calculating a desired value to be supplied to one of the frictional engaging elements now being engaged based on a difference obtained by subtracting the second torque from the first torque; and hydraulic pressure control circuit for supplying hydraulic pressure to one of the frictional engaging elements based on at least the calculated desired value, wherein the first torque calculating means includes:
engine speed discriminating means for discriminating whether the detected engine speed is less than a predetermined speed;
and when the detected engine speed is discriminated to be less than the predetermined value, calculates the first torque to be a predetermined value.

2. A system according to claim 1, wherein the desired value calculating means calculates the desired value to a value which is corresponding to be the first torque when the shifting begins and to be decreased with respect to time after the shifting begins.

3. A system according to claim 2, wherein the desired value calculating means calculates the desired value to be decreased with respect to time for a predetermined period of time after the shifting begins.

4. A system according to claim 1, wherein the transmission has a torque converter and the first torque calculating means includes:

engine torque calculating means for calculating an engine torque generated by the engine in accordance with predetermined characteristics based on at least an engine speed and an engine load of the detected operating conditions;

inertial torque calculating means for calculating a parameter indicative of an inertia torque used raising the engine speed based on the engine speed; and torque converter torque ratio calculating means for calculating a torque ratio of the torque converter;

and calculates the input torque based on at least the calculated engine torque, the calculated parameter and the calculated torque ratio.

5. A method of controlling an automatic transmission of a vehicle having an input shaft connected to an internal combustion engine mounted on the vehicle and an output shaft connected to driven wheels of the vehicle, the transmission transmitting input torque, through any of frictional engaging elements, generated by the engine and inputted by the input shaft to the driven wheels by the output shaft, in accordance with predetermined shift scheduling defining a target gear based on detected operating conditions of the vehicle and the engine, comprising the steps of:

(a) detecting the operating conditions of the vehicle and the engine including at least an engine speed;

(b) detecting an input shaft rotational speed inputted to the transmission;

(c) calculating a first torque to be inputted to the transmission based on at least the detected operating conditions and the input shaft rotational speed;

(d) calculating a second torque necessary for advancing shifting in the transmission based on at least the detected operating conditions and the input shaft rotational speed when the shifting is downshifting;

(e) calculating a desired value to be supplied to one of the frictional engaging elements now being engaged based on a difference obtained by subtracting the second torque from the first torque; and (f) supplying hydraulic pressure to the one of the frictional engaging elements based on at least the calculated desired value, wherein the step (c) includes the step of:

(g) discriminating whether the detected engine speed is less than a predetermined speed; and
when the detected engine speed is discriminated to be less than the predetermined value, calculating the first torque to be a predetermined value.

6. A method according to claim 5, wherein the step of (e) calculates the desired value to a value which is corresponding to be the first torque when the shifting begins and to be decreased with respect to time after the shifting begins.

7. A method according to claim 6, wherein the step of (e) calculates the desired value to be decreased with respect to time for a predetermined period of time after the shifting begins.

8. A method according to claim 5, wherein the transmission has a torque converter and the step (c) includes the steps of:
   (i) calculating an engine torque generated by the engine in accordance with predetermined characteristics based on at least an engine speed and an engine load of the detected operating conditions;
   (j) calculating a parameter indicative of an inertia torque used raising the engine speed based on the engine speed; and
   torque converter torque ratio calculating means for calculating a torque ratio of the torque converter;
   and calculates the input torque based on at least the calculated engine torque, the calculated parameter and the calculated torque ratio.

9. A system for controlling an automatic transmission of a vehicle having an input shaft connected to an interval combustion engine mounted on the vehicle and an output shaft connected to driven wheels of the vehicle, the transmission transmitting input torque, through any of frictional engaging elements, generated by the engine and inputted by the input shaft to be driven wheels by the output shaft, in accordance with predetermined shift scheduling defining a target gear based on detected operating conditions of the vehicle and the engine speed;
   input shaft rotational speed detecting means for detecting an input shaft rotational speed inputted to the transmission;
   first torque calculating means for calculating a first torque to be inputted to the transmission based on at least the detected operating conditions and the input shaft rotational speed.
   second torque calculating means for calculating a second torque necessary for advancing shifting in the transmission from an inertia necessary for advancing the shifting and a desired shifting time which are determined based on at least the detected operating condition and the input shaft rotational speed, when the shifting is downshifting;
   desired value calculating means for calculating a desired value to be supplied to one of the friction engaging elements now being engaged based on a differences obtained by subtracting the second torque from the first torque; and
   hydraulic pressure control circuit for supplying hydraulic pressure to the one of the friction engaging elements based on at least the calculated desired value.

10. A system according to claim 9, wherein the desired value calculating means calculates the desired value which is corresponding to be the first torque when the shifting begins and to be decreased with respect to time after the shifting begins.

11. A system according to claim 10, wherein the desired value calculating means calculates the desired value to be decreased with respect to time for a predetermined period time after the shifting begins.

12. A system according to claim 9, wherein the first torque calculating means comprises:
   engine speed discriminating means for discriminating whether the detected engine speed is less than a predetermined speed;
   and when the detected engine speed is discriminated to be less than the predetermined value, calculates the first torque to be predetermined value.

13. A system according to claim 10, wherein the first torque calculating means comprises:
   engine speed discriminating means for discriminating whether the detected engine speed is less than a predetermined speed;
   and when the detected engine speed is discriminated to be less than a predetermined value, calculates the first torque to be a predetermined value.

14. A system according to claim 9, wherein the transmission has a torque converter and the first torque calculating means comprises:
   engine torque calculating means for calculating an engine torque generated by the engine in accordance with predetermined characteristics based on at least an engine speed and an engine load of the detected operating conditions;
   inertial torque calculating means for calculating a parameter indicative of an inertia torque used raising the engine speed based on the engine speed; and
   torque converter torque ratio calculating means for calculating a torque ration of the torque converter;
   and calculates the input torque base on at least the calculated engine torque, the calculated parameter and the calculated torque rati.

15. A method of controlling an automatic transmission of a vehicle having an input shaft connected to an internal combustion engine mounted on the vehicle and an output shaft connected to driven wheels of the vehicle, the transmission transmitting input torque, through any of frictional engaging elements, generated by the engine and inputted by the input shaft to the driven wheels by the output shaft, in accordance with predetermined shift scheduling defining a target gear based on detected operating conditions of the vehicle and the engine, comprising the steps of:
   (a) detecting the operation conditions of the vehicle and the engine including at least an engine speed;
   (b) detecting an input shaft rotational speed inputted to the transmission;
   (c) calculating a first torque to be inputted to the transmission based on at least the detected operating conditions and the input shaft rotational speed;
   (d) calculating a second torque necessary for advancing shifting in the transmission from an inertia necessary for advancing the shifting and a desired shifting time which are determined based on at least the detected operating conditions and the input shaft rotational speed, when the shifting is downshifting;
   (e) calculating a desired value to be supplied to one of the frictional engaging elements now being engaged based on a difference obtained by subtracting the second torque from the first torque; and
   (f) supplying hydraulic pressure to the one of the frictional engaging elements based on at least the calculated desired value.

16. A method according to claim 15, wherein the step (e) calculates the desired value to a value which is corresponding to be the first torque when the shifting begins and to be decreased with respect to time after the shifting begins.

17. A method according to claim 16, wherein the step (e) calculates the desired value to be decreased with respect to time for a predetermined period of time after the shifting begins.

18. A method according to claim 15, wherein the step (c) includes the step of:
(g) discriminating whether the detected engine speed is less than a predetermined speed; and
when the detected speed is discriminated to be less than the predetermined value, calculating the first torque to be predetermined value.

19. A method according to claim 16, wherein the step (c) includes the step of:
(h) discriminating whether the detected engine speed is less than a predetermined speed; and
when the detected engine speed is discriminated to be less than the predetermined value, calculating the first torque to be a predetermined value.

20. A method according to claim 15, wherein the transmission has a torque converter and the step (c) includes the steps of:
(i) calculating an engine torgue generated by the engine in accordance with predetermined characteristics based on at least an engine speed and an engine load of the detected operating conditions;
(j) calculating a parameter indicative of an inertia torque used raising the engine speed based on the engine speed; and
torque converter torque convertor torque ration calculating as torque ration of the torque converter; and
calculating the input torque based on at least the calculated engine torque, the calculated parameter and the calculated torque ration.

* * * * *

UNITED STATES PATENT AND TRADEMARK OFFICE
CERTIFICATE OF CORRECTION

PATENT NO. : 6,554,739 B2
DATED : April 29, 2003
INVENTOR(S) : Yoshiharu Saito et al.

It is certified that error appears in the above-identified patent and that said Letters Patent is hereby corrected as shown below:

Column 11,
Line 66, change "one" to -- the one --.

Column 13,
Line 25, change "interval" to -- internal --.
Line 30, change "be" to -- the --.
Line 33, change "speed;" to -- , comprising: --.
Line 34, insert -- operating condition detecting means for detecting the operating conditions of the vehicle and the engine including at least an engine speed --.
Line 40, change "speed." to -- speed --.
Lines 45-46, change "condition" to -- conditions --.
Lines 50 and 55, change "friction" to -- frictional --.

Column 14,
Line 14, change "a predetermined value" to -- the predetermined speed --.
Line 29, change "ration" to -- ratio --.
Line 32, change "rati" to -- ratio --.

Column 16,
Lines 12, 13 and 17, change "ration" to -- ratio --.
Line 13, delete "torque converter". (Second occurrence)

Signed and Sealed this

Tenth Day of February, 2004

JON W. DUDAS
*Acting Director of the United States Patent and Trademark Office*